United States Patent Office 3,121,132
Patented Feb. 11, 1964

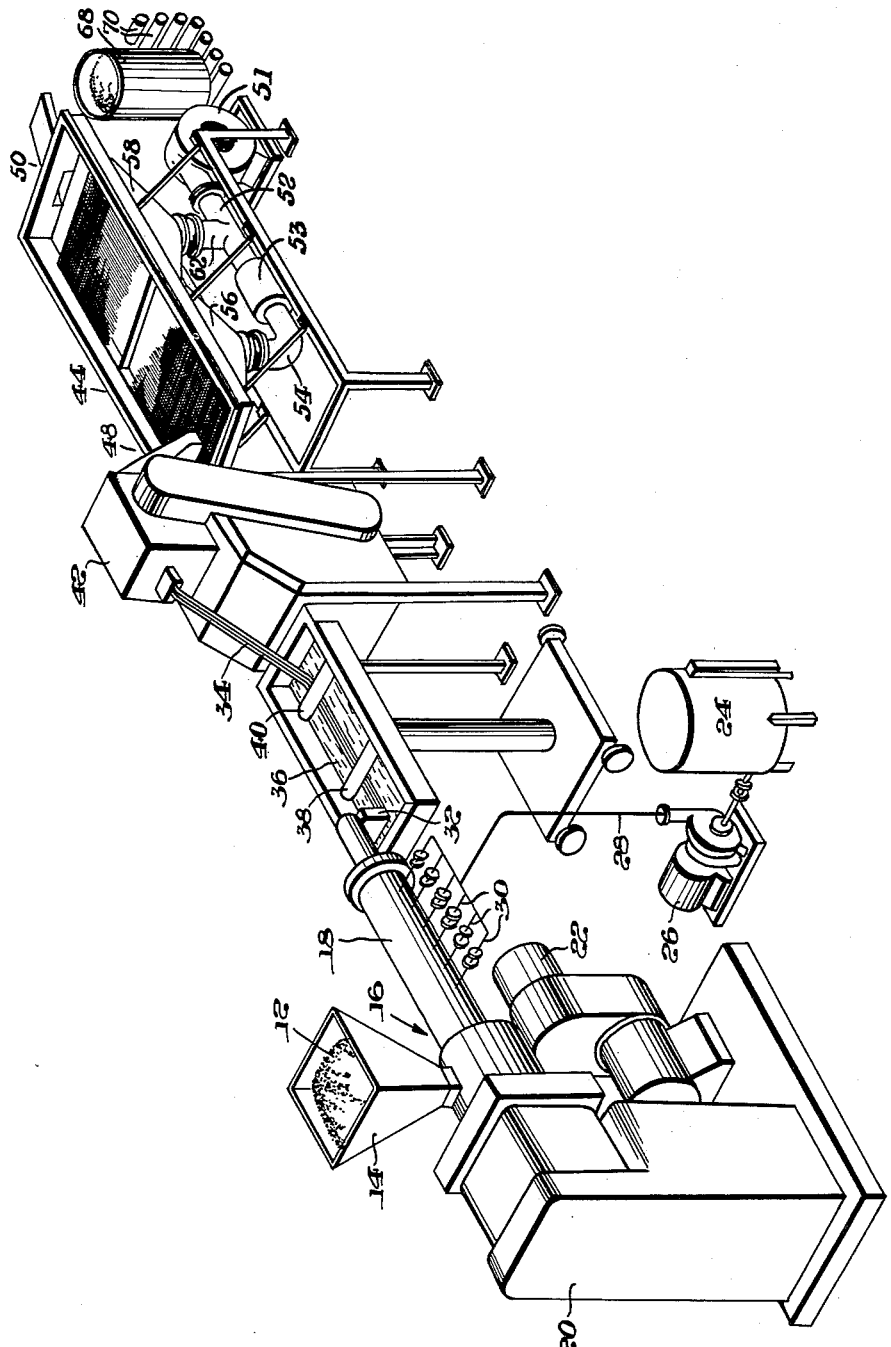

3,121,132
STRESS RELIEVING EXPANDABLE PLASTIC
PARTICLES
Sam J. Del Bene, Ambridge, Pa., assignor to Koppers
Company, Inc., a corporation of Delaware
Filed Dec. 18, 1961, Ser. No. 159,837
1 Claim. (Cl. 264—143)

This invention relates generally to a process for forming particles which will feed smoothly to processing equipment and more particularly to a process for relieving the stress of expandable vinyl aromatic plastic particles.

The production of light-weight shaped articles, such as toys, and of insulating layers molded to the required contours for refrigerators, freezer cabinets, trailer bodies, and the like is carried out by the expansion in molds of particles of an expandable polymer. Suitable expandable polymer particles normally have incorporated therein 3–30% by weight of a low boiling expanding agent.

Polymers which may be rendered expandable include polystyrene, polyvinyl chloride, polyvinylidene chloride, alkyl substituted styrenes, polyacrylic esters, and polymethacrylic esters, copolymers of styrene and alpha-methyl styrene, and also alkyl substituted styrenes, as vinyl toluene, copolymers of styrene with small amounts of divinyl benzene, copolymers of butadiene or other dienes, or acrylonitrile and styrene, the compositions having at least 50 percent styrene, and mixtures of polystyrene and rubbers, both natural and synthetic.

The expanding agent is a compound which boils between about 5°–100° C. Advantageously, the expanding agent may be a volatile aliphatic or cycloaliphatic hydrocarbon, such as petroleum ether, pentane, hexane, heptane, cyclopentane, cyclohexane, cyclopentadiene, and mixtures thereof which have a boiling point lower than the softening point of the polymer. These expanding agents generally constitute three to thirty percent of the total weight of the mixture.

The particles of expandable polymer are capable of great expansion when subjected to heat, expanding as much as from 20–30 times their original size. When the particles are used directly for the molding, the particles may initially occupy less than ten percent of the volume of the mold. As a result, there is a tendency for the expansion of the beads not to be uniform; particles at the top of the mold, for example, may undergo a greater expansion and therefore be less dense than the particles at the lower part of the mold, particularly since the expanded particles are good insulators and the initial expansion of some of the particles tends to insulate other particles not so completely expanded from adequate exposure to heat.

To provide for uniform expansion in the mold, the expandable particles are pre-expanded outside the mold until the particles have substantially the bulk density required for the finished article. Conveniently, this pre-expansion may be carried out in apparatus such as described in copending application, Serial No. 689,195, filed October 9, 1957, now Patent No. 3,023,175. This pre-expansion not only gives more uniformity in the molded parts but makes possible the production of less dense parts. Thereafter, the mold is substantially filled with the pre-expanded particles and re-expanded to fit the contour of the mold. The details of the mold are sharply defined in the finished product. For mass production technique, the pre-expanded particles should be free-flowing and be of substantially uniform bulk density.

Heretofore, difficulties have been found in the pre-expansion of expandable polymers, such as polystyrene. One difficulty has been that the particles, prior to being pre-expanded, do not feed properly, i.e., not free-flowing. The exact reason for this is not known. However, it is believed that the particles mesh together. It has been found that a majority of the particles have a length about ten times as great as the width. These particles appear to mesh like hay in conventional feeding mechanisms. It may be that the particles are too light and ragged to feed properly. In any event, the operations of a continuous feeder are frequently interrupted because of the failure of the particles to feed properly.

It has now been found that the foregoing disadvantages may be eliminated if the particles are stress relieved. The stress is apparently imposed during the processing steps. The extrusion through the die, the sudden shock cooling when the strands of polymer hit cold water in the bath, the orientation when the strands are subjected to tension in the bath, and the additional stress imposed by the cutting machine, all contribute to the stress on the particles. It is believed that the particles have a "memory," and that when heated to a particular temperature, the molecules will reorient themselves whereby to relieve the stress. This reorientation of the molecules is hereinafter referred to as molecular positional rearrangement. Although the "memory" theory is believed to be correct, it is also possible that at the temperatures used, the particles become sufficiently fluid for the surface tension to cause the particles to contract. By stress relieving the particles, they may then be fed continuously without difficulty.

An object of the present invention, therefore, is to provide a novel process for the controlled stress relief of particles of expandable polymers, to thereby produce particles which are capable of being fed continuously to a processing apparatus.

In accordance with the invention, expandable particles are subjected to a temperature at which molecular positional rearrangement can occur, but below the temperature at which the particles expand. Operable temperatures fall in the range of 170°–210° F. A temperature of about 190° F. is preferred thereby relieving the stress and changing the size and shape of the particles. During this process, the bulk density of the particles increases up to about thirty percent. This increase in bulk density has the additional advantage of permitting the shipment or storage of larger quantities of the product in containers of the same size. Relief of the stress also results in a particle having a smoother exterior surface which further aids in the flow characteristics of the particles.

The above and further objects and novel features of the invention will appear more fully in the following detailed description when the same is read in conjunction with the accompanying drawing. It is to be expressly understood, however, that the drawing is not intended to be a definition of the invention, but is for the purpose of illustration only.

The drawing shows a partially schematic elevational side view of apparatus for carrying out the invention.

In the drawing, polymeric particles 12, alone or in combination with a blowing agent adjunct, are placed in the hopper 14 of a conventional extrusion machine 16 and fed to an extruder screw (not shown) which is contained in the barrel 18 of the extruder 16. The extruder screw is driven by a thrust bearing driven by a flexible coupling which in turn is driven by a gear reducer, all of which are located in housing 20 and are driven by motor 22. A blowing agent is pumped from tank 24 by constant pressure pump 26, through conduit 28 to conduit 30 and then injected into the barrel 18 of the extruder. The normally liquid blowing agent becomes intimately mixed with the plastic in extruder 18. The mixture of blowing agent and plastic exits from the extruder through multiple orifice die 32 in the form of strands 34. An extrusion temperature in the range of about 200°–450° F. may be used.

The strands 34 are fed to water bath 36 in which they are shock cooled in order to avoid any expansion of the polymer. The bath temperature will advantageously be in the range of 30°–100° F. The strands 34 are maintained below the liquid level of the bath by rollers 38 and 40. The strands 34 are then fed to a chopper 42 wherein they are cut up into small particles. The particles generally have a ratio of length to diameter of from 12:1 to 1:1. The diameter may be from 1/16 to 1/64 inch, and the length may be from 1/16 to 3/16 inch or more. The particles leaving the chopper are passed to a vibrating screen 44, vibrated by suitable means such as a pair of offset cams (not shown). The vibrations of the screen convey the particles along the screen from the intake end 48 to the exit end 50.

As stated above, the particles are elongated, ragged, and stressed and do not feed properly to the feeding mechanism. Surprisingly, it has been found that by heating the particles to the proper temperature, the raggedness disappears, the elongation diminishes considerably, the stress is relieved, and the particles feed properly. Amazingly, another wholly unexpected result is produced by the heat treatment of the particles. Heretofore, when expandable particles have been heat treated, they expand and therefore bulk density of the particles decreases. It has now been found that by heating within the critical temperature limits for a short period of time the bulk density actually increases, thereby permitting the storage of greater quantities of material in smaller containers.

According to the invention, hot air from blower 51 is passed upwardly through screen 44 at the intake end of the screen through conduits 52, 54 and windbox 56. The air is heated by suitable means such as heater 53 located in conduit 52. The air is sufficiently hot that the particles on screen 44 are heated to a point where molecular positional rearrangement can occur. This temperature must be within the range of 170°–210° F. Residence time of the particles over the heated section may vary between about 0.5 and 15 seconds depending upon the temperature. Upon undergoing the treatment in accordance with this invention, the stress previously imposed upon the particles by the extrusion, cooling, tension and chopping is relieved; the shape of the particles is altered and the bulk density is increased. The particles then continue along vibrating screen 44 to the exit end 50 where they are subjected to a cold blast of air to cool them. The cold air should be between 40° and 90° F. and the residence time is between 0.5 and 15 seconds. The cold air is directed through lines 52, 62 and windbox 58, thence through the vibrating screen 44 and the particles. After being cooled, the particles fall into container 68 which is movable on rollers 70. They may be packaged, as shown, and stored, or delivered directly to a continuous pre-expander or other processing apparatus. The passage of air (both hot and cold) through the particles causes them to form a fluid bed whereby equal heating and cooling of the particles is attained.

In the operation of the preferred embodiment of this invention using a vibrating screen and a blast of air, polystyrene particles were fed in the hopper 14 of extrusion machine 16 and flowed into the barrel 18 of the extruder 16. The extruder was run using a rear cylinder temperature of 250° F., a front cylinder temperature of 280° F., a die temperature of 300° F., and a screw speed of 67 r.p.m. The die had 1/64 inch apertures and was set at right angles to the extruder and extruder into water bath 36. Pentane as blowing agent was added to the extruder barrel 18 from storage tank 24 through lines 28 and 30. The mixture of blowing agent and polystyrene extruded through the multiple orifice die 32 in the form of strands. The strands were shock cooled as they entered the water bath which was maintained at a temperature of 50° F. Upon emerging from the water bath, the strands were fed to chopper 42 wherein they were chopped into particles averaging 0.11 inch in length.

The polystyrene particles from the chopper were fed at a rate of 250 pounds per hour, one foot from the end 48 of vibrating screen 44 which was ten feet long and nine inches wide. The vibrating action conveyed the material along the screen from one end to the other. As the material was being conveyed, heated air at a temperature of 190° F. was blown through the first five foot section causing a fluid bed. Cooled air at a temperature of 65° F. was passed through the remaining five feet of the screen and also maintained the fluid bed while cooling the product. The total residence time over the vibrating screen was 16 seconds, and of this time, the particles were over the heated section for about seven seconds. The bed depth was about 1/8 inch. The particle size of the cooled particles leaving the vibrating screen was 0.022 to 0.025 inch in diameter by 0.06 to 0.068 inch in length. The bulk density was increased 28%.

The stress relieved particles were tested for pre-expansion and molding capacity. The material fed well to a pre-expander of the type disclosed in the aforementioned Patent No. 3,023,175 and resulted in good quality pre-expanded particles. Moldings made from the stress relieved pre-expanded particles were of excellent quality having uniform density throughout and clear sharp detail.

The foregoing has presented a novel process for the stress relief of polymeric particles which can be pre-expanded and then further expanded in a mold. The product produced by this invention is free-flowing and its bulk density is increased substantially above the bulk density of the particles normally fed to a pre-expander.

Although the foregoing has illustrated and described the invention in detail, it is to be expressly understood that various changes can be made without departing from the scope of the invention, as will be understood by those skilled in the art.

I claim:

A process for stress relieving expandable particles comprising the steps of:
(a) incorporating 3–30 percent by weight of a volatile aliphatic hydrocarbon blowing agent which boils between about 5° and 100° C. into polystyrene,
(b) extruding said polystyrene with said blowing agent in the form of strands,
(c) cooling the strands to prevent expansion thereof,
(d) cutting said strands into small particles, and
(e) flowing heated air at a temperature between 170 and 210° F. past said particles for a period of from 15–0.5 seconds to heat said particles to a temperature sufficient to relieve the stress and increase the bulk density of the particles.

References Cited in the file of this patent

UNITED STATES PATENTS

| | | |
|---|---|---|
| 2,317,409 | Seaton | Apr. 27, 1943 |
| 2,990,580 | Foster | July 4, 1961 |
| 3,026,273 | Engles | Mar. 20, 1962 |